(12) United States Patent
Goossen et al.

(10) Patent No.: US 7,841,563 B2
(45) Date of Patent: Nov. 30, 2010

(54) DUCTED FAN AIR DATA SYSTEM

(75) Inventors: Emray R. Goossen, Albuquerque, NM (US); Jonathan Lee Fleming, Blacksburg, VA (US)

(73) Assignee: Honeywell International Inc., Morristown, NJ (US)

(*) Notice: Subject to any disclaimer, the term of this patent is extended or adjusted under 35 U.S.C. 154(b) by 197 days.

(21) Appl. No.: 11/685,532

(22) Filed: Mar. 13, 2007

(65) Prior Publication Data
US 2007/0221790 A1    Sep. 27, 2007

Related U.S. Application Data

(60) Provisional application No. 60/786,625, filed on Mar. 27, 2006.

(51) Int. Cl.
G05D 1/00 (2006.01)
B64C 27/00 (2006.01)
B64C 27/20 (2006.01)

(52) U.S. Cl. .......... 244/175; 244/23 C; 244/53 B; 244/17.13; 73/170.14; 73/170.02

(58) Field of Classification Search .......... 244/76 B, 244/73 R, 62, 1 R, 17.13, 194, 195, 53 B, 244/73 B, 73 C, 12.2, 23 C, 23 R, 23 A, 7 B, 244/34 A, 12.1, 175; 73/170.02, 170.14, 73/180, 170.08, 170.09, 179, 861.66, 183, 73/178 H, 170.07, 502; 415/118; 60/226.1; 137/152.2, 15.1; D12/330
See application file for complete search history.

(56) References Cited

U.S. PATENT DOCUMENTS

| 3,883,095 | A | * | 5/1975 | Fletcher et al. ........... 244/53 B |
| 4,829,813 | A | * | 5/1989 | Syed ........................ 73/112.01 |
| 4,893,261 | A | * | 1/1990 | Flint et al. ................ 244/17.13 |
| 6,134,485 | A | * | 10/2000 | Tanielian et al. .......... 244/17.13 |
| 2005/0131591 | A1 | * | 6/2005 | Drutowski et al. .............. 701/3 |
| 2006/0027702 | A1 | * | 2/2006 | Rouse et al. ............. 244/17.13 |

FOREIGN PATENT DOCUMENTS

FR    2 871 136       4/2004
RU    2 046 344 C1    11/1992

OTHER PUBLICATIONS

Definition of "around", Random House Unabridged Dictionary, Copyright 1997, by Random House, Inc., accessed online on Jul. 27, 2009 at http://dictionary.infoplease.com/around.*
European Search Report for 07104858.1-1236 / 1840578 dated Sep. 2, 2008.

* cited by examiner

*Primary Examiner*—Tien Dinh
*Assistant Examiner*—Richard R Green
(74) *Attorney, Agent, or Firm*—Fogg & Powers LLC

(57) ABSTRACT

An air data system and method for a ducted fan air-vehicle is described. The air data system includes a plurality of air pressure sensors placed around a lip of an air duct of the ducted fan air-vehicle. The air data system calculates the speed and direction of airflow surrounding the ducted fan air-vehicle based on pressure data measured across the lip of the air duct. Additionally, the air data system may estimate forces generated by airflow surrounding the air-vehicle.

20 Claims, 8 Drawing Sheets

DUCTED FAN AIR DATA SYSTEM

RELATED APPLICATIONS

The present patent application claims priority under 35 U.S.C. §119(e) to U.S. Provisional Patent Application Ser. No. 60/786,625, which was filed Mar. 27, 2006. The full disclosure of U.S. Provisional Patent Application Ser. No. 60/786,625 is incorporated herein by reference.

GOVERNMENT RIGHTS

The United States Government has acquired certain rights in this invention pursuant to Contract No. MDA972-01-9-0018, awarded by the Defense Advanced Research Project Agency (DARPA).

FIELD

The present invention relates generally to ducted fan air-vehicles, and more particularly, relates to an air data system and method for measurement of air pressures and control of ducted fan air-vehicles.

BACKGROUND

It is difficult to measure air data (e.g., wind speed and direction) on a ducted fan air-vehicle, such as an unmanned aerial vehicle (UAV). The difficulty is due in part to the air speed of the ducted fan air-vehicle. The air speed of a ducted fan air-vehicle can be much slower than a typical fixed-wing aircraft. In fact, ducted fan air-vehicles have the ability of low speed flight and are well known for stationary hovering aerodynamic performance. These low air speeds make it difficult to measure air data with typical air data systems, as most air data sensors are not sensitive enough at low speeds to obtain reliable air data.

Air data systems typically use pressure sensors to make air data measurements. For example, air data systems generally implement static and pilot tube pressure sensors in order to derive altitude of the air-vehicle, wind velocity, and/or vehicle velocity. Pilot tubes are generally effective at providing air-speed and altitude information by measuring static pressure, dynamic pressure, and temperature about an air-vehicle. However, pilot tubes have limited value for hovering and low speed flight because they lose accuracy at speeds below about 20 m/s. Therefore, pilot tubes have limited value when measuring airflow surrounding a ducted fan air-vehicle in low speed and hovering flight, such as airflow caused by wind gusts and wind shears.

Further, it is difficult to place pilot tubes on an aircraft such that the pilot tubes are capable of measuring airflow from all directions. Pilot tubes are used to place pressure sensors outside the disturbance caused by a vehicle traveling through the air. In a ducted fan hovering condition these pilot tubes would have to extend multiple duct diameters in all directions to reach out to undisturbed air. Pilot tubes can extend out from a fixed wing air-vehicle up to seven inches.

Static pressure sensors can be flush mounted to the frame of an aircraft, however, as with pilot tubes, air data systems employing flush mounted static pressure sensors similarly lose accuracy at speeds below about 30.5 m/s. Other methods capable of measuring air data parameters exist, such as optical data systems. However, such optical data systems may be too large to be used on many ducted fan air-vehicles, such as a UAV or a Miniature Air Vehicle (MAV).

Another difficulty in measuring air data surrounding a ducted fan air-vehicle is that the ducted fan itself generates airflow around the air-vehicle. The thrust of a ducted fan creates its own generated environment around the air-vehicle, and this environment can disturb the airflow several diameters around the air-vehicle. A significant amount of downward expended air re-circulates back up around the outside of the air-vehicle and is returned back to the duct inlet. This generated air environment makes obtaining cross-wind components of airflow difficult. Moreover, this effect of the generated air environment diminishes the ability of traditional static and pilot tube air data systems to measure airflow disturbances outside the generated environment. As a result, the air data system may have difficulty in compensating for these disturbances.

The purpose in measuring surrounding airflow is for controlling stability or contributing to the control of air-vehicle flight. An avionics system may be used to control the altitude, positioning, and forward speeds of a ducted fan air-vehicle. The avionics system may benefit from the use of sensor inputs from an air data system in order to control the air-vehicle.

Generally, holding a fixed position in space of an air-vehicle relative to ground objects is dependent on inertial or GPS sensors. However, such sensors react to displacement caused by the disturbances of wind gusts and wind shears. Since the vehicle is moved from a fixed position to generate a control error for position, the airflow may result in significant movement of an air-vehicle before compensation by a vehicle control system utilizing inertial or GPS sensors.

Therefore, it would be beneficial to provide a ducted fan air-vehicle with an air data system for improved vehicle control that can accurately measure at hovering and low speed flight conditions the speed, direction, and the resulting displacement forces on the vehicle from cross winds, wind shears, wind gusts, and time dependent aerodynamic forces.

SUMMARY

An air data system and method for a ducted fan air-vehicle is described. The air data system includes an air duct of the ducted fan air-vehicle, with a plurality of air pressure sensors placed around a lip of an air duct. The air pressure sensors are capable of measuring air pressure data. The system further may include a processor operable to receive the air pressure data from the air pressure sensors and calculate speed and direction of airflow surrounding the air-vehicle based on the pressure data measured by the air pressure sensors across the lip of the air duct.

The plurality of air pressure sensors are arranged across the lip of the air duct and are preferably flush mounted sensors. The air pressure sensors are preferably mounted at a high velocity low pressure region within the air duct of the air-vehicle. This high velocity low pressure region may be the highest velocity lowest pressure region within the air duct. This region is typically on the inner lip of the duct leading edge. The air pressure sensors may be mounted within a duct lip port. The sensors may also include pairs of pressure sensors that are placed around the lip of the air duct at substantially 180 degrees apart from each other. Preferably, the pressure sensors include multiple pairs of pressure sensors, in which each pressure sensor in a pair is placed substantially 180 degrees apart from the other. The air data system may include any number of pairs of pressure sensors. For instance, the air data system may include four pairs of pressure sensors.

The system measures the speed and direction of airflow surrounding the ducted fan air-vehicle. The system uses the measured speed and direction of airflow to determine wind gusts and wind shears. The system may also measure the velocity of the air-vehicle. Further, the air data system may provide the ability to use the measured speed and direction of airflow in order to estimate the forces generated by the airflow on the air-vehicle. A vehicle stability control system may use the air data generated by the air data system to adjust the vehicle attitude to prevent spatial translations of the vehicle that may result from the airflow surrounding the air-vehicle.

A method of measuring air data for an air-vehicle is also described. The method of measuring air data includes placing a plurality of air pressure sensors within a lip of an air duct of the air-vehicle such that the air pressure sensors include at least one pair of air pressure sensors that measure pressure at one point on the lip of the air duct and at another point substantially 180 degrees away. The air pressure sensors may be connected to a processor that is operable to calculate speed and direction of airflow surrounding the air-vehicle based on the air pressure measurements. Measurement of direction in addition to speed preferably utilizes at least four pressure sensors.

Further, a method for calculating the speed and direction of airflow surrounding an air-vehicle is described. An air data system may obtain a plurality of air pressure measurements within a lip of an air duct of the air-vehicle. An air data system may then compensate the pressure measurements for vehicle attitude. For instance, the pressure measurements may be compensated for the air-vehicle pitch and roll attitudes.

The air data system may calculate a plurality of pressure differentials across the lip of the air duct. The air data system may compensate the pressure differentials by the fan speed of the fan of the air-vehicle. Further, the air data system may compensate the pressure differentials by the air density of the surrounding air. The air data system may apply a linear velocity curve fit to the compensated pressure differentials, and a plurality of individual velocity vectors across the lip of the air duct may be generated based on the linear velocity curve fit. The air data system may generate the speed and direction of airflow based on the individual velocity vectors.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIGS. 2A and 2B are each example cross-sections of a side of the air duct of FIG. 1, taken from point A to A, wherein FIG. 2A illustrates a pressure sensor mounted in a lip of the air duct, and FIG. 2B illustrates a pressure sensor flush mounted on the lip of the air duct;

DETAILED DESCRIPTION

Figure 1:
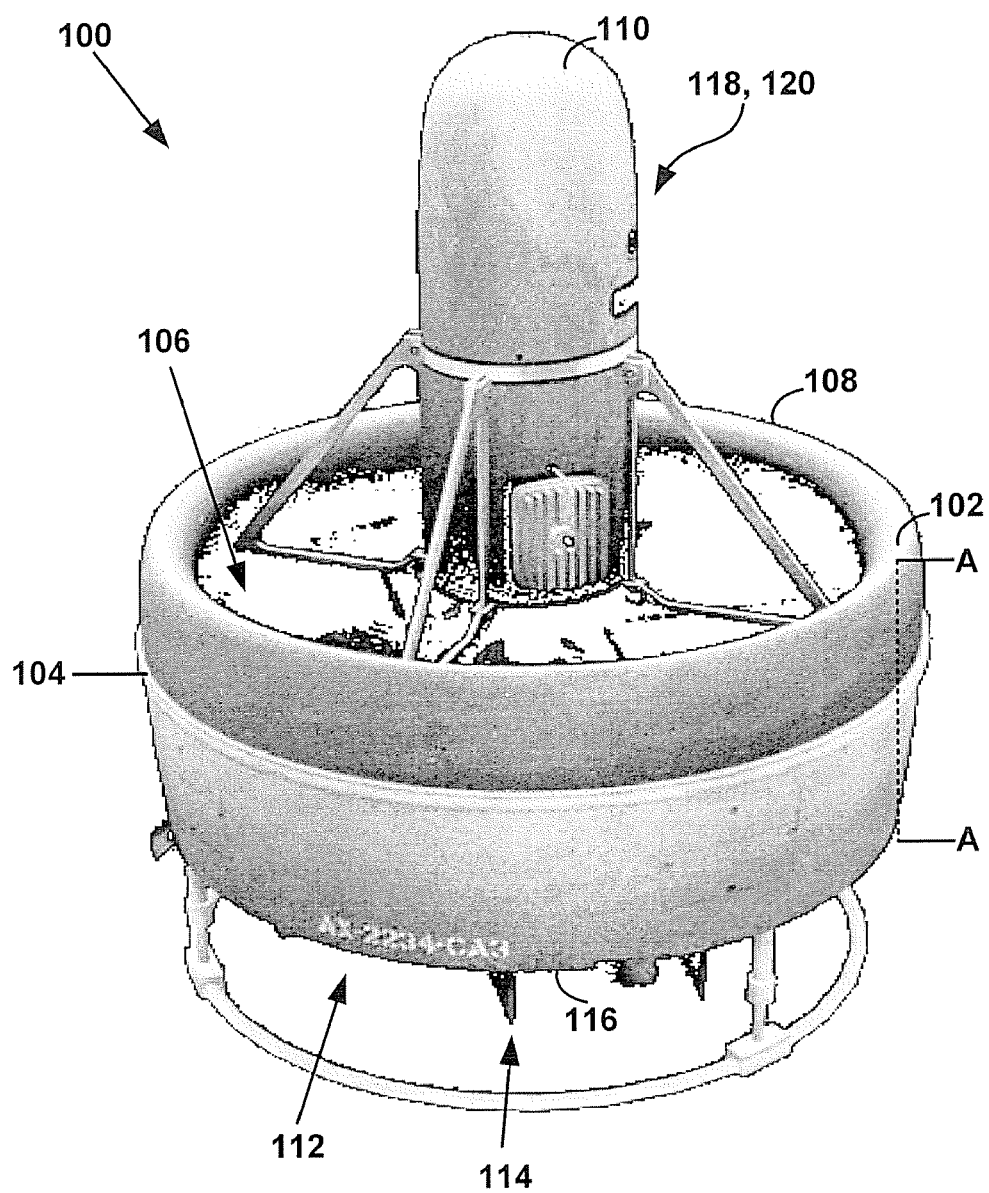
FIG. 1 is a pictorial representation of a ducted fan air-vehicle including an air data system, according to an example.

FIG. 1 is a pictorial representation of a ducted fan air-vehicle 100 including an air data system 102. The ducted fan air-vehicle 100 includes an air duct 104 having a lip 108 and a fan 106 located within the air duct 104. The air data system 102 may be located on the duct lip leading edge within the lip 108 of the air duct 104.

Additionally, the ducted fan air-vehicle 100 may have center body 110. The center body 110 may be a housing that contains other components of the air-vehicle 100. The center body 110 may contain an engine for powering the air-vehicle 100. The center body 110 may contain additional components for air-vehicle operation, such as a processor 118 for the air data system 102 and an avionics system 120.

The ducted fan air-vehicle 100 may also include a stator assembly 112 and vanes 114 for providing thrust vectoring. The stator assembly 112 and vanes 114 may be located under the fan 106 located within the air duct 104. The stator assembly 112 may be located just under the fan 106 in the air duct 104 to direct linear flow of the air produced by the fan 106. The vanes 114 may also be placed under the fan 106. For instance, the vanes 114 may be placed slightly below an exit section 116 of the air duct 104. The air-vehicle 100 may contain fixed and/or movable vanes 114 to perform thirst vectoring for the air-vehicle 100.

FIG. 1 depicts the ducted fan air-vehicle 100 as a Class II Organic Air Vehicle (OAV). However, the air data system 102 may be used on other ducted fan air-vehicles, such as a Miniature Air Vehicle (MAV), OAV-I, and other vertical take-off and landing (VTOL) vehicles. Further, although the air data system 102 is described in reference to a ducted fan air-vehicle 100, the air data system 102 may be used in other air duct applications in which airflow parameters, such as speed and direction, need to be measured. The air data system may be used in any application where there is means for forcing air through an air duct. For example, the air data system 102 may be used in a system with helicopter tail rotors located in a duct. Further, the air data system 102 may be used in a system with the means outside the duct, such as in a duct mounted above a helicopter main rotor. Other applications with means for forcing air through a duct and that may utilize the air data system 102 include a turbine engine and a cooling tower.

The ducted fan air-vehicle 100 may include additional components, such as the avionics system 120. The avionics system 120 may be located in the center body 110 of the air-vehicle 100. The avionics system 120 may control the air-vehicle 100 by controlling the altitude, positioning, and forward speeds of the air-vehicle 100. The avionics system 120 may control the aircraft using various inputs. For instance, the avionics system 120 may use inputs, such as inertial sensors, GPS, and airflow speed and direction, in order to control the air-vehicle 100. The air data system 102 may provide such inputs to the avionics system 120.

The air data system 102 may also determine the forces the airflow generates on the air-vehicle 100, and these forces may also utilized by the avionics system 120 for control of the air vehicle 100. Additionally, the avionics system 120 may utilize inputs from a GPS sensor and/or an inertial sensor.

The air data system 102 may be integrated into the lip 108 of the air duct 104 of the ducted fan air-vehicle 100. The air data system 102 preferably includes the processor 118. Alternatively, the air data system 102 may include multiple processors. The processor 118 may be any combination of hardware, fin-ware, and/or software operable to interpret and execute instructions, typically from a software application. For example, the processor 118 may be a microcontroller, a microprocessor, or an application-specific integrated circuit (ASIC). The processor 118 may be located in the center body 110 of the air-vehicle 100. Alternatively, the processor 118 could be located in the air duct 104 of the air-vehicle 100.

The processor 118 of the air data system 102 is preferably operable to calculate the air data surrounding the air-vehicle 100. For instance, the processor 118 is operable to receive pressure data from the plurality of pressure sensors and calculate direction and magnitude of airflow, such as wind gusts and wind shears, surrounding the air-vehicle 100. The processor 118 of the air data system 102 may also be operable to calculate the forces of the airflow on the air-vehicle.

Figure 2A:
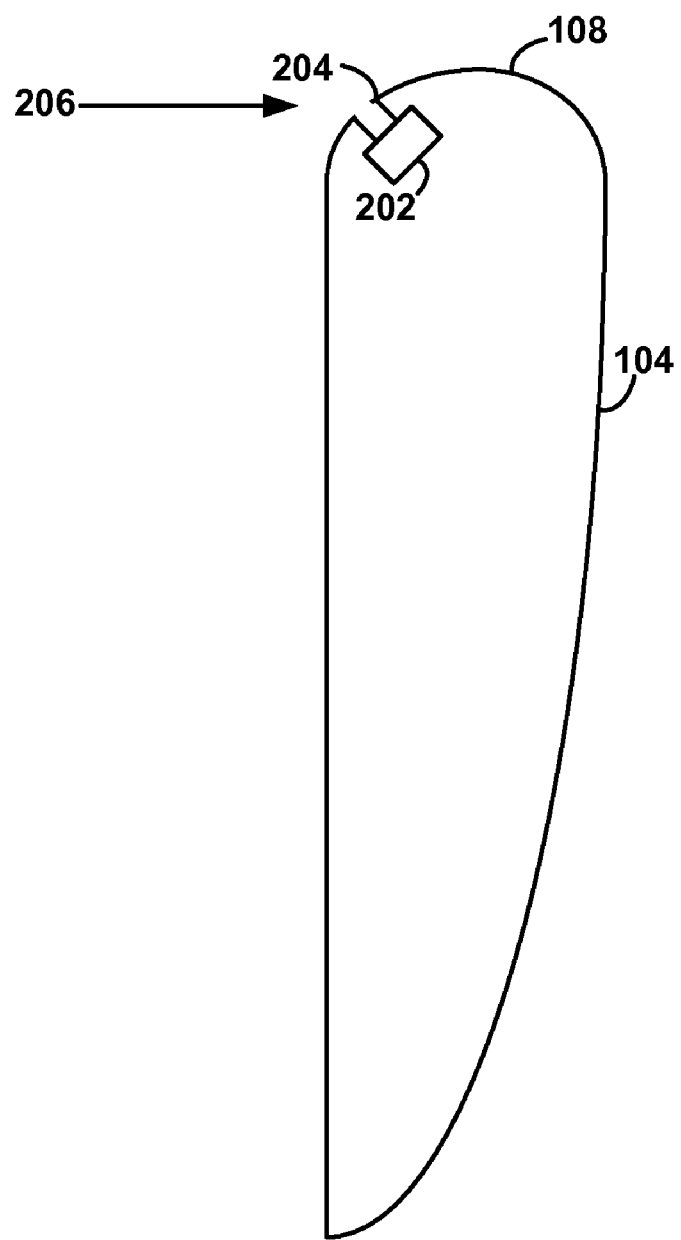
Figure 3:
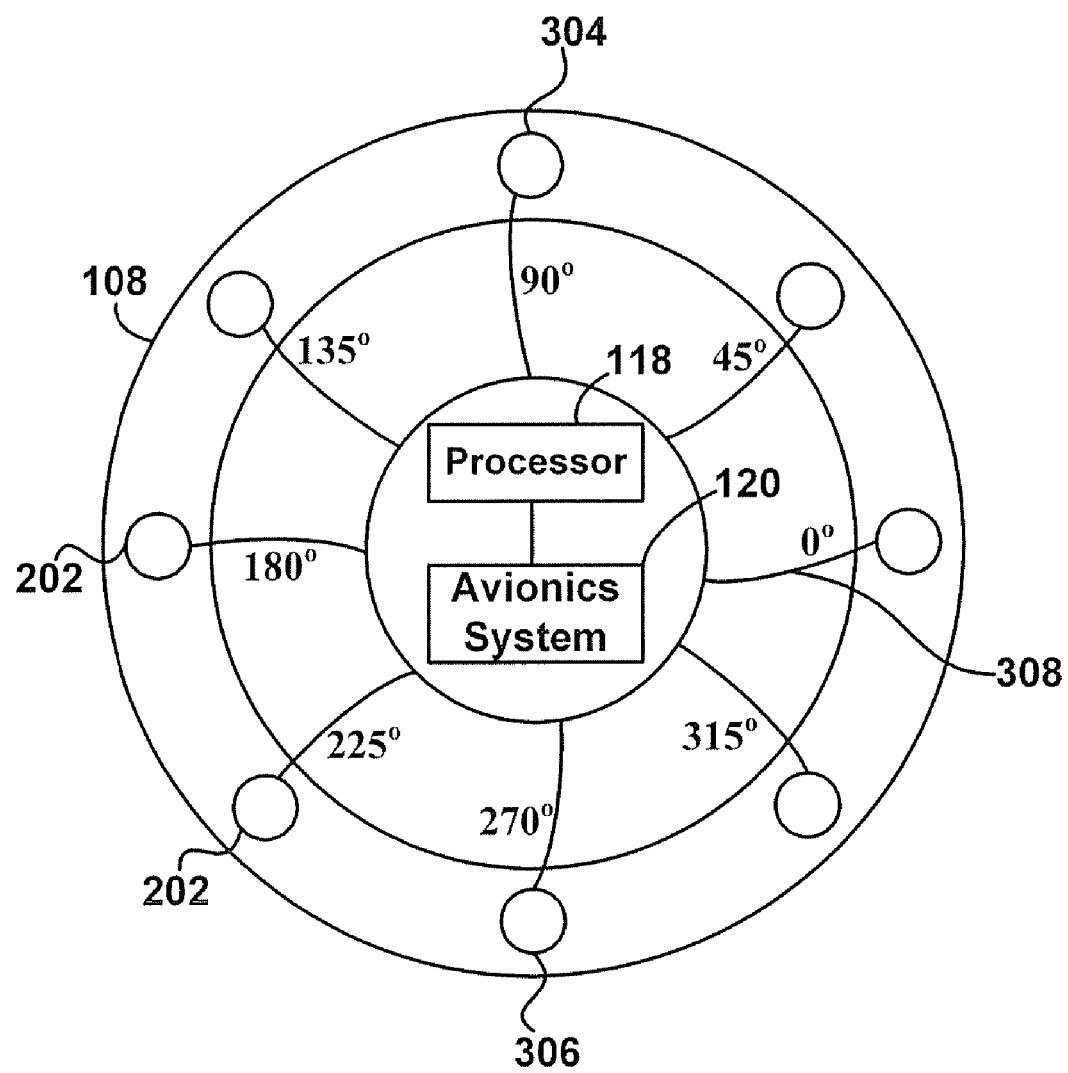
FIG. 3 is a top view of an air data system, according to an example.

The location of the air data system 102 within the air-vehicle 100 may be more clearly seen in FIG. 2A and FIG. 3. FIG. 2A depicts a cross section of a side of air duct 104 of FIG. 1, taken from point A to A, with a pressure sensor 202 mounted in the lip 108 of the air duct 104, and FIG. 3 is a top view of the air data system 102.

Figure 2B:
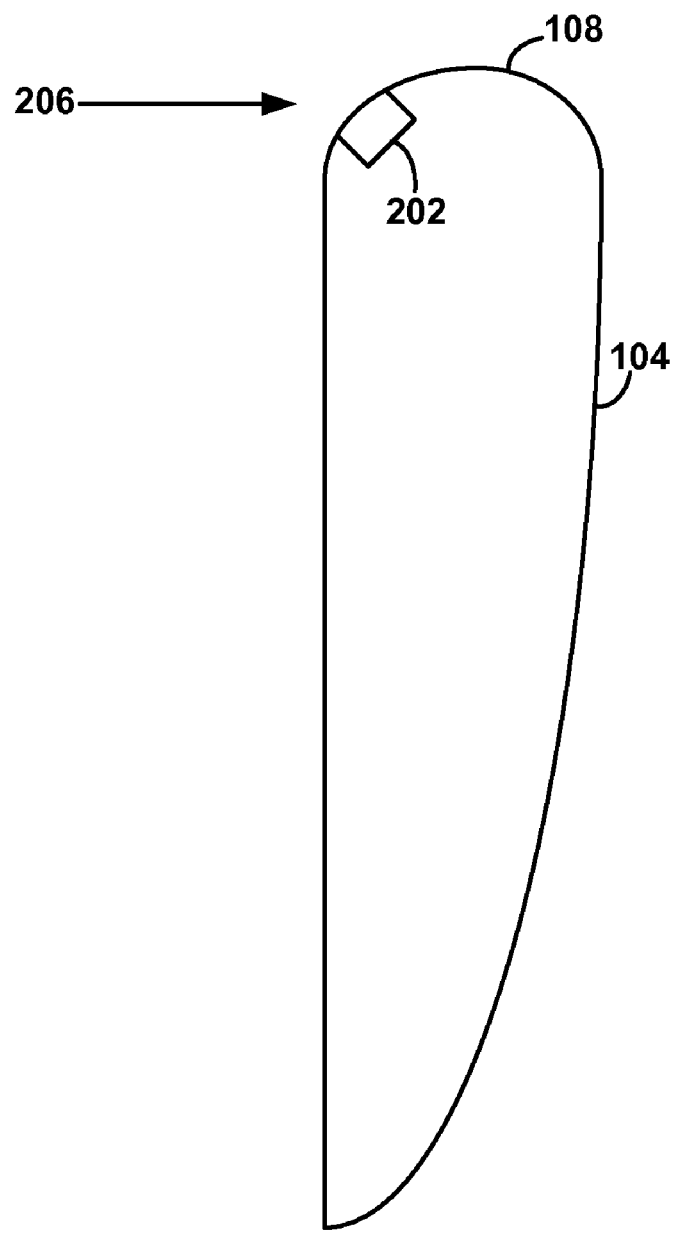

As shown in FIG. 2A, a pressure sensor 202 is mounted internal to the air duct 104 within a duct lip port 204. The pressure sensor 202 may be a static pressure sensor. Preferably, the pressure sensor 202 may be flush mounted on the lip 108 of the air duct 104, as shown in FIG. 2B. Further, the pressure sensor 202 is preferably mounted at a high velocity low pressure region 206 that may be formed at the lip 108 of the air duct 104. For instance, the pressure sensor 202 may be mounted at the highest velocity lowest pressure region that may be formed at the lip 108 of the air duct 104. The shape of the lip 108 of the air duct 104 generates high velocity low pressure areas that are very sensitive to cross winds and develop pressures in the sensitivity ranges of pressure sensor 202. As is known in the art, a high velocity low pressure region 206 may be formed at the lip 108 of the air duct 104 due to the Bernoulli principle.

The pressure sensor 202 is preferably placed in the high velocity low pressure region 206 in order to increase the sensitivity of the pressure sensor 202. Preferably, the placement of the pressure sensor 202 and other pressure sensors in the air data system 102 may be determined by testing the placement in wind tunnel testing. Alternatively, the placement may be determined using computational flow dynamic simulation and analysis.

In addition, the pressure sensor 202 and the other pressure sensors are preferably located such that the arrangement of pressure sensors is not influenced by lip flow separation. Preferably, the pressure sensors are not influenced by lip flow separation over a wide range of flight conditions. As is known in the art, the shape of the air duct 104 is an important factor in minimizing separated lip flow issues that may arise when measuring pressure across the lip 108 of the air duct 104. Preferably, the shape of the air duct 104 of the air-vehicle 100 is designed to avoid such lip flow separation.

Referring to FIG. 3, the air data system 102 includes a plurality of pressure sensors 202 placed around the lip 108 of the air duct 104. Pairs of pressure sensors, such as pair 304 and 306 are placed opposite each other at substantially 180 degrees apart. Although FIG. 3 shows a representative set of 8 pressure sensors 202 placed at 45 degree intervals, the exact number and placement of sensors can be varied to increase the resolution of the air data parameters. For example, the air data system 102 may include ten pressure sensors, with each placed at substantially 36 degree intervals from adjacent pressure sensors 202. Other arrangements are possible as well.

The pressure sensors 202 may be connected to the processor 118 of the air data system 102 via wiring 308. Alternatively, the connection between the pressure sensors 202 and the processor 118 may be wireless. The pressure sensors 202 may be capable of sending pressure sensor measurements to the processor 118. Further, the avionics system 120 may be connected to the processor 118.

Figure 4:
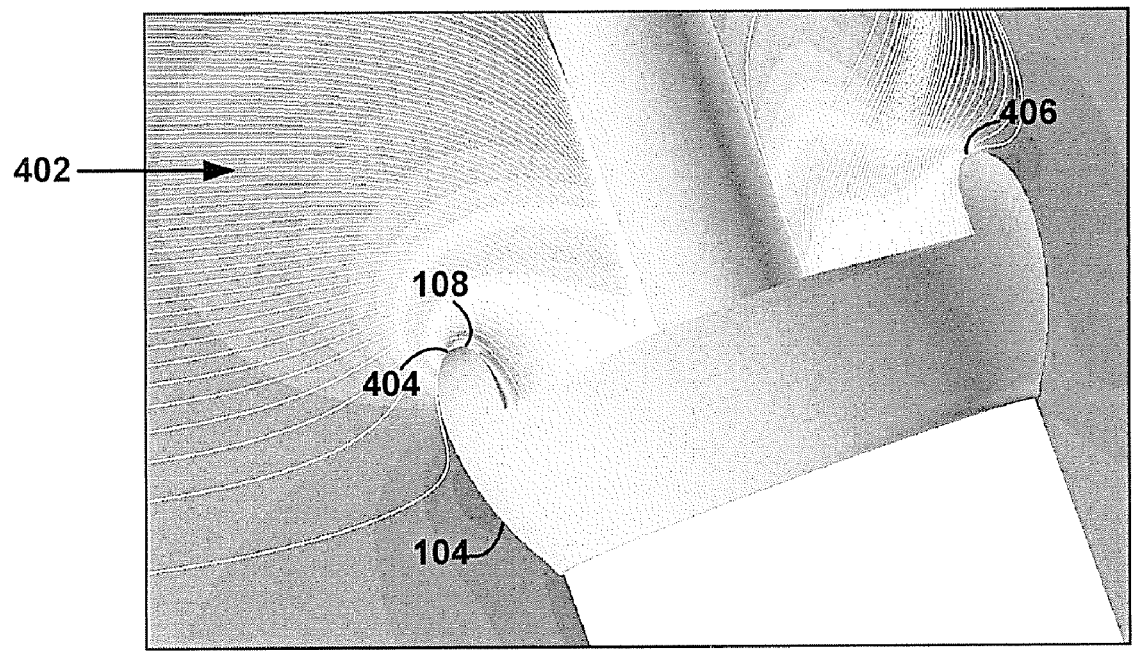
FIG. 4 is a pictorial side view representation of airflow surrounding the air duct, according to an example.

FIG. 4 is a pictorial representation of airflow 402 surrounding the air duct 104 of the ducted fan air-vehicle 100. The airflow 402 is depicted as flowing from the left-hand side of the page to the right-hand side. Of course, the airflow 402 may flow in many directions with respect to the ducted fan air-vehicle 100.

As shown in FIG. 4, there is a pressure differential at the lip 108 of the air duct 104 on the windward side 404 of the air duct 104 and the leeward side 406 of the air duct 104. The air data system 102 takes advantage of this pressure differential between the windward side 404 and leeward side 406 of the air duct 104 in order to provide airflow information.

The pressure differential between sides 404, 406 of the air duct 104 may be calculated as $\Delta p_{duct} = p_{windward} - p_{leeward}$. When a plurality of pressure sensors pairs 304, 306 are placed across the lip 108 of the air duct 104 as depicted in FIG. 3, the air data system 102 may measure and calculate a plurality of pressure differentials. Preferably, the pressure sensors 202 measure the pressure and the processor 118 of the air data system 102 calculates the plurality of pressure differentials across the air duct 104.

Generally, the pressure sensors 202 are sensitive to the velocity of the airflow 402, and there may be a linear relationship between the differential pressure measurements and velocity of the airflow 402. This linear relationship between the pressure measurements across the air duct 104 and the velocity of the airflow 402 surrounding the air duct 104 is useful for calculating the air data.

Figure 5:
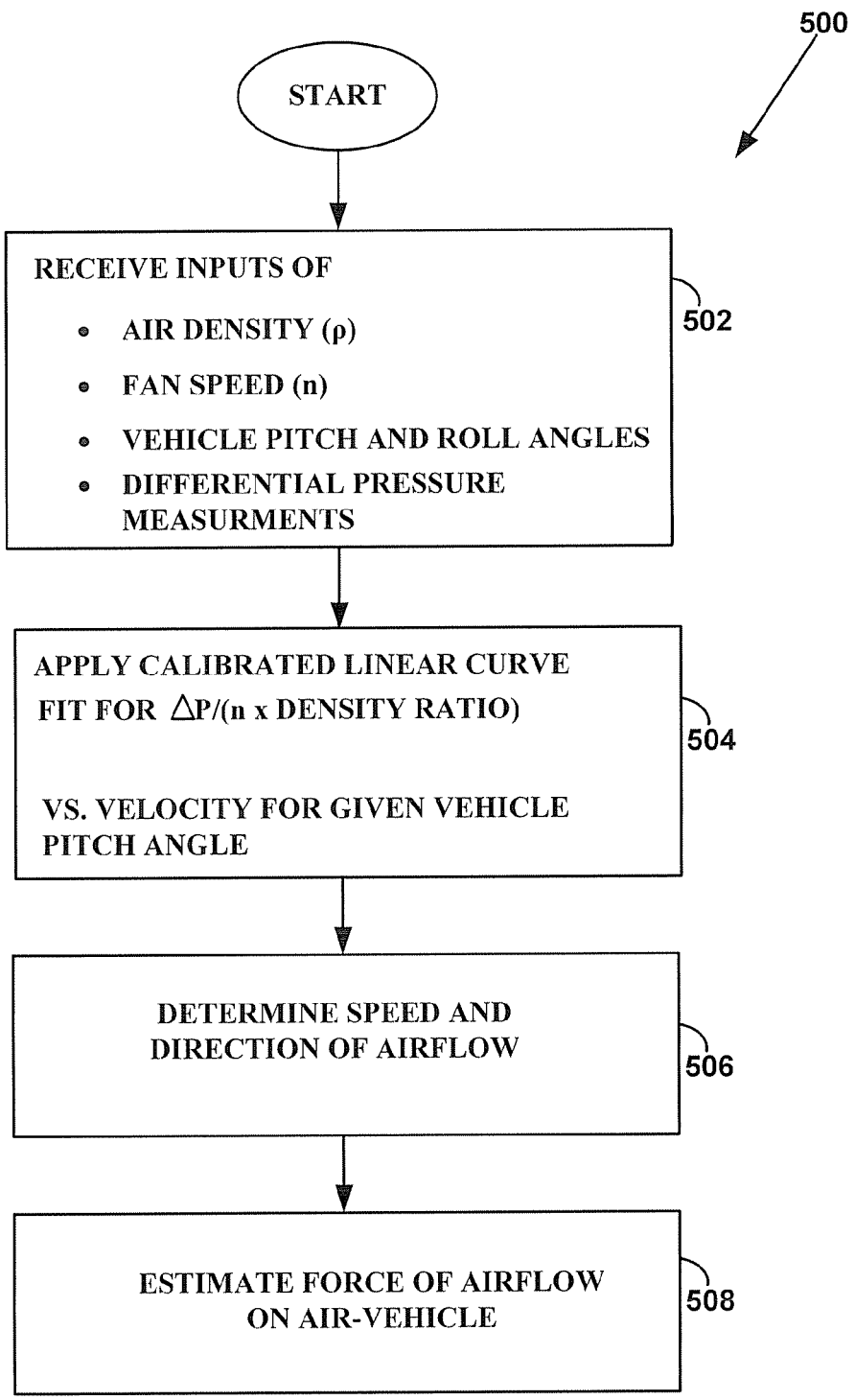
FIG. 5 is a flow chart depicting a method for air data generation, according to an example.

FIG. 5 is a flow chart depicting a method 500 for air data generation by the air data system 102 of the ducted fan air-vehicle 100. The example depicted in FIG. 5 shows steps that may be performed by the processor 118 of the air data system 102.

At block 502, the air data system 102 may receive inputs used to determine air data. These inputs may include air density ($\rho$), fan speed (n) of the ducted fan 106, vehicle pitch angle, vehicle roll angle, and differential pressures measurements from the pairs of pressure sensors 202 across the lip 108 of the air duct 104. The processor 118 of the air data system 102 may receive these inputs.

At block 504, the air data system 102 may apply a calibrated linear curve fit for a pressure differential against velocity of the airflow 402. As mentioned above, there is a linear relationship between the differential pressure measurements of the pairs of pressure sensors 202 and the velocity of airflow 402 surrounding the ducted fan air-vehicle 100. The pressure differential measurements may be adjusted by the other inputs received at block 502 in order to accurately determine the linear relationship between the pressure differentials across the lip 108 of the air duct 104 and the velocity of airflow 402 surrounding the air-vehicle 100. Applying the calibrated linear curve fit is further described in reference to FIG. 6.

At block 506, the air data system 102 may determine the speed and direction of the airflow 402. The air data system 102 may determine the speed and direction of the airflow 402 based on the calibrated linear curve fit for a pressure differential against velocity of the airflow 402 applied at block 504. This determination is further described in reference to FIG. 6.

At block 508 the air data system 102 may estimate the force the airflow 402 generates on the air-vehicle 100. The air data system 102 may estimate the force the airflow 402 generates on the air-vehicle 100 based on the calibrated linear curve fit for a pressure differential against velocity of the airflow 402 applied at block 504. This estimation is further described in reference to FIG. 6.

The air data system 102 may repeat the method 500 for air data generation throughout the flight of the air-vehicle 100 in order to generate air data. Alternatively, the air data system 102 may repeat the method 500 for air data generation periodically during the flight of the air-vehicle 100.

Figure 6:
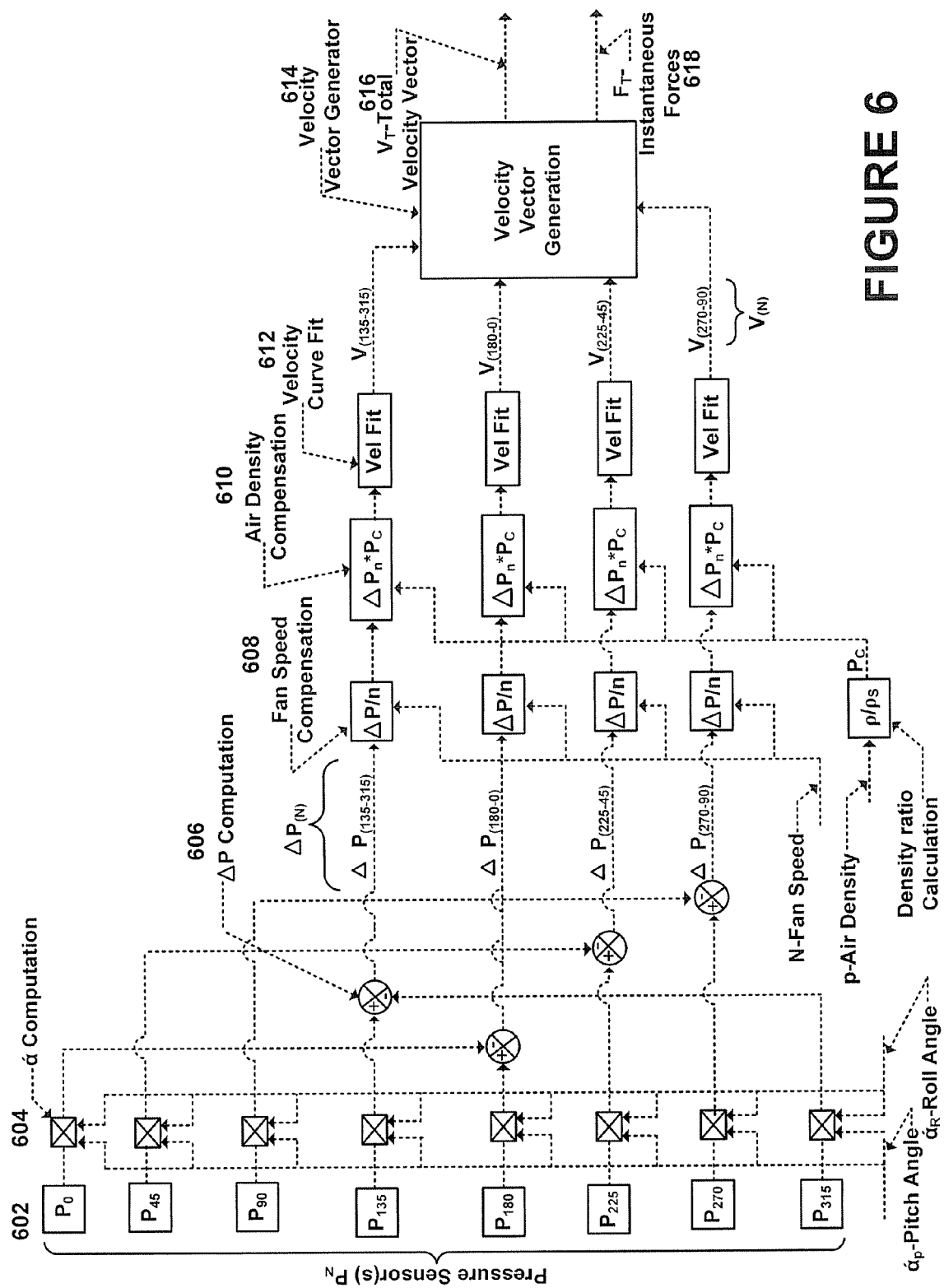
FIG. 6 is a flow diagram depicting computation data flow for applying a linear curve fit for generating air data of FIG. 5, according to an example.

FIG. 6 is a flow diagram 600 depicting computation data flow for applying the calibrated linear curve fit described at block 504.

At block 602, the processor 118 receives pressure inputs based on airflow 402 flowing through the air duct 104 from the pressure sensors 202 of the air data system 102. At block 604, each pressure sensor input is modified by the ducted fan air-vehicle attitude. For example, each pressure input is modified by a $\alpha_P$ pitch angle in order to compensate for the pitch of the ducted fan air-vehicle. Further, each pressure sensor input is modified by a $\alpha_R$ roll angle in order to compensate for the roll attitude of the ducted fan air-vehicle. The relative magnitudes of pressure data may be modified by a gain multiplier factor of attitude. This compensation does a coordinate transformation between the earth axis and the vehicle axis. Vehicle attitude is an indicator of relative wind velocity either from desired speed or compensation for winds. The pitch and roll angles may be estimated from the avionics system 120 of the air-vehicle. For instance, the pitch and roll angles of the air-vehicle may be determined with a vehicle inertial sensor system.

At block 606, the air data system 102 may compute pressure differential values between pairs of pressure sensors 202. As mentioned above, the pressure differentials may be calculated between a pressure sensor 202 on the windward side 404 of the air duct 104 and the pressure sensor 202 substantially 180 degrees away on the leeward side is 406 of the air duct 104. The differential sensor pair value may be obtained by subtracting the pressure sensor input obtained at a first pressure sensor of a pair from the pressure sensor input obtained at a second pressure sensor of the pair.

For instance, one differential measurement may be the difference between the pressure measured by pressure sensor 202 located at 0 degrees and the pressure sensor 202 located at 180 degrees. In an air data system 102 having eight pressure sensors 202, such as depicted in FIG. 3 and FIG. 6, there is preferably four differential pressure measurements. In such an arrangement of pressure sensors, the differential pressure measurements are $\Delta p_{(135-315)}$, $\Delta p_{(180-0)}$, $\Delta p_{(225-45)}$, and $\Delta p_{(270-90)}$ Alternatively, pressure differentials may be calculated from pairs of sensors other than pairs with sensors directly across the duct at substantially 180 degrees. For example, a pressure differential measurement may be obtained from the 135 degree pressure sensor position and the 225 degree pressure sensor position in an eight pressure sensor configuration. Other pairs for pressure differential measurements are possible as well.

At block 608, the differential pressure sensor pair values may be compensated by the fan speed n in order to linearize the differential pressure pair values. The pressure differential can be normalized on fan speed by dividing the differential pressure measurements by the fan speed, $\Delta p/n$.

At block 610, the air data system 102 may perform air density compensation from the air density input $P_C$. Density altitude is calculated from the temperature and pressure. The pressure number used is the average of all sensor pressures. Density altitude $DH=145426[1-((P_O/P_{SL})/(T/T_{SL}))^{0.235}]$, where $P_O$ is atmospheric pressure, $P_{SL}$ is sea level atmospheric pressure, T is air temperature, and $T_{SL}$ is sea level air temperature, is then applied to each individual $\Delta p$.

At block 612, the air data system 102 may apply a linear velocity curve fit for linearization of the air data in order to generate individual velocities of airflow across the air duct. Therefore, for the compensated $\Delta P_{(135-315)}$, $\Delta P_{(180-0)}$, $\Delta P_{(225-45)}$, and $\Delta P_{(270-90)}$, the air data system 102 may apply velocity curve fits to the pressure differentials in order to generate the individual velocities of airflow 402 across the air duct 104. In the arrangement having eight pressure sensors 202 as depicted in FIG. 3, the air data system 102 generates four individual velocity vectors $V_N$, denoted $V_{(135-315)}$, $V_{(180-0)}$, $V_{(225-45)}$, and $V_{(270-90)}$ in FIG. 6. After the pressure differentials have been compensated and normalized, the pressure differential vs. velocity of airflow relationship is linear, and intercept values of the linear curve fit are near zero. Therefore, the individual velocity vectors $V_N$ may be obtained from the pressure data measured by the pressure sensors 202.

Figure 7:
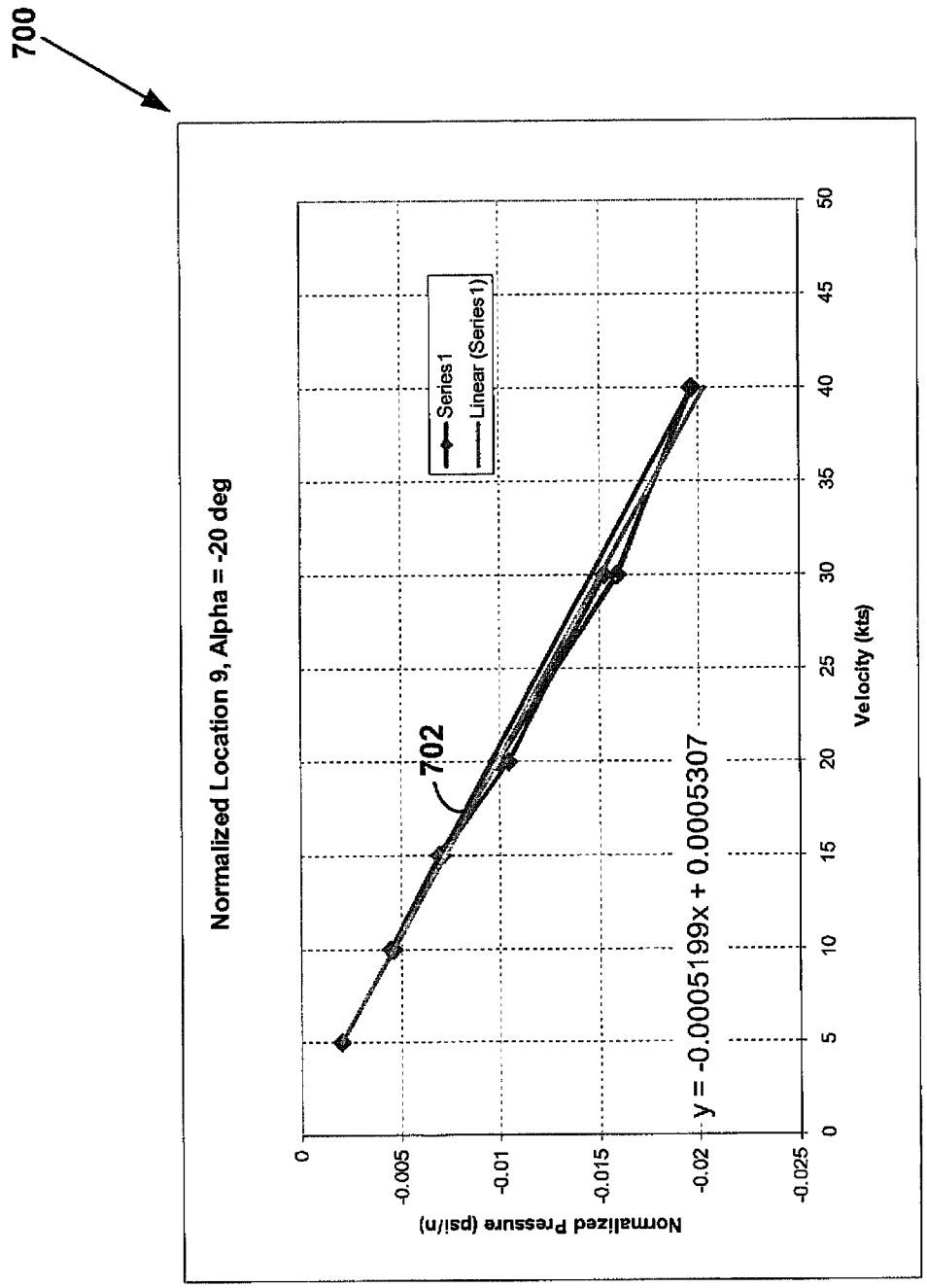
FIG. 7 is a graph illustrating a linear curve fit for velocity data against compensated and normalized pressure data, according to an example.

For example, FIG. 7 shows a graph 700 illustrating a linear velocity curve fit 702 for compensated and normalized pressure data plotted against velocity, for a given vehicle pitch, with an intercept value near zero. The linear velocity curve fit 702 of calibrated and normalized pressure data plotted against velocity may vary for different vehicle pitch angles.

Returning to FIG. 6, at block 614, the processor 118 may process the obtained velocity curve fits in order to generate a total velocity vector ($V_T$) 616 of the airflow based on the individual velocity vectors of air across the lip of the air duct. The processor 118 may generate $V_T$ by summing the individual velocity vectors $V_{(135-315)}$, $V_{(180-0)}$, $V_{(225-45)}$, and $V_{(270-90)}$. This total velocity vector includes the speed and direction of the airflow with respect to the air-vehicle 100.

Also, at block 614, the processor 118 may process the obtained velocity curve fits in order to generate the instantaneous forces ($F_T$) 618 generated by the airflow 402 on the air-vehicle 100. The instantaneous forces 618 may be utilized by the avionics system 120 to control the air-vehicle 100. As is known in the art, the forces generated by the airflow on the vehicle may be estimated from the speed and direction of airflow acting on the vehicle. The avionics system 120 may use the estimated forces generated by the processor 118 of the air data system 102 in order to adjust the vehicle attitude to prevent lateral translations resulting from the airflow 402 surrounding the air-vehicle 100, such as from wind gusts and wind shears.

Further, the speed and direction of the airflow and forces generated by the airflow 402 on the air-vehicle 100 may be used by an inner loop gust rejection control system. This system may tilt the air-vehicle in the direction of the wind or wind gust as calculated by the air-vehicle in anticipation of the forces being applied in order to prevent any resulting lateral translations.

The air data system 102 may provide the air-vehicle 100 with an air data system that can accurately measure speed, direction, and the resulting displacement forces on the vehicle from cross winds, wind shears, wind gusts, and time dependent aerodynamic forces. The air data system 102 measures air data based on a collection of air pressure measurements across the lip of an air duct. Based on the collection of air pressure measurements the air data system calculates differential pressure between a first point on the lip of the air duct and a second point substantially 180 degrees away from the first point. Using the measurements, the air data system may operate to determine speed, direction, and the resulting displacement forces on the vehicle from airflow surrounding the air-vehicle. In addition, rather than adjusting vehicle attitude to correct lateral translations of the air-vehicle 100 based on errors provided by GPS or inertial sensors, an avionics system may utilize the information provided by the air data system 102 in order to adjust vehicle attitude to prevent such lateral translations of the air-vehicle 100.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A system for an air-vehicle, the system comprising:
   an air duct comprising a lip;
   a fan located within the air duct;
   a plurality of air pressure sensors placed around and within the lip of the air duct operable to measure air pressure data; and
   a processor that receives the air pressure data from the plurality of air pressure sensors and calculates speed and direction of airflow surrounding the air-vehicle based on a plurality of pressure differentials across the lip of the air duct determined from the air pressure data measured by the plurality of air pressure sensors.

2. The system of claim 1, wherein the plurality of air pressure sensors are flush mounted sensors.

3. The system of claim 2, wherein the flush mounted sensors are mounted at a high velocity, low pressure region at the lip of the air duct.

4. The system of claim 1, wherein the plurality of air pressure sensors placed around the lip of the air duct are mounted within a duct lip port.

5. The system of claim 1, wherein the plurality of air pressure sensors includes at least one pair of pressure sensors placed around the lip substantially 180 degrees apart, wherein the processor receives pressure inputs from each of the pressure sensors.

6. The system of claim 1, wherein the processor is operable to estimate the air-vehicle velocity based on the speed and direction of the airflow surrounding the air-vehicle.

7. The system of claim 1, wherein the processor is operable to estimate forces acting on the air-vehicle generated by airflow surrounding the air-vehicle.

8. The system of claim 7, further comprising an avionics system that receives an estimate of at least one force of the forces acting on the air-vehicle and adjusts an attitude of the air vehicle based on the estimate.

9. The system of claim 1, further comprising a plurality of vanes placed at an exit section of the air duct.

10. The system of claim 1, wherein each air pressure sensor of the plurality of air pressure sensors is mounted to the lip at a respective position internal to the air duct.

11. A method of measuring air data for a ducted fan air-vehicle, the method comprising:
    placing a plurality of air pressure sensors within a lip of an air duct of the air-vehicle such that the plurality of air pressure sensors includes at least one pair of air pressure sensors comprising a first air pressure sensor that measures pressure at a first point on the lip of the air duct and a second air pressure sensor that measures pressure at a second point on the lip of the air duct substantially 180 degrees away from the first point; and
    connecting a processor to the plurality of air pressure sensors, wherein the processor calculates speed and direction of airflow surrounding the air-vehicle based on a differential between pressure inputs received from each of the first and second air pressure sensors of the at least one pair of air pressure sensors.

12. The method of claim 11, wherein placing a plurality of air pressure sensors on the lip of the air duct of the air-vehicle includes flush mounting the plurality of air pressure sensors to the lip of the air duct.

13. The method of claim 12, wherein flush mounting the plurality of air pressure sensors to the lip of the air duct includes mounting the plurality of air pressure sensors at a high velocity low pressure region at the lip of the air duct of the air-vehicle.

14. The method of claim 11, wherein the processor is operable to estimate forces acting on the air-vehicle generated by the airflow surrounding the air-vehicle.

15. The method of claim 11, wherein the processor is operable to estimate air-vehicle velocity based on the speed and direction of airflow surrounding the air-vehicle.

16. The method of claim 11, wherein the processor operable to calculate speed and direction of airflow calculates direction of airflow by:
    calculating a plurality of pressure differentials between the first point on the lip of the air duct and the second point on the lip of the air duct substantially 180 degrees apart from the first point;
    calculating a plurality of vectors from the plurality of pressure differentials;
    summing the plurality of vectors; and
    calculating the direction of the airflow based on the sum of the plurality of vectors.

17. The method of claim 11, wherein a fan is located within the air duct and placing the plurality of air pressure sensors within the lip of the air duct comprises placing the plurality of air pressure sensors within the lip of a leading edge of the air duct.

18. A method for calculating speed and direction of airflow surrounding a ducted fan air-vehicle, the method comprising:
    obtaining a plurality of pressure measurements within a lip of an air duct of the air-vehicle via a plurality of air pressure sensors;
    compensating the plurality of pressure measurements for vehicle attitude;
    determining a plurality of pressure differentials across the lip of the air duct via a plurality of pairs of the air pressure sensors, wherein at least one pair of air pressure sensors comprises a first air pressure sensor that measures pressure at a first point on the lip of the air duct and a second air pressure sensor that measures pressure at a second point on the lip of the air duct substantially 180 degrees away from the first point;
    compensating the plurality of pressure differentials for a fan speed of the fan of the air-vehicle and air density to arrive at a plurality of compensated pressure differentials;
    applying a linear velocity curve lit for the compensated pressure differentials;
    generating a plurality of individual velocity vectors across the lip of the air duct based on the linear velocity curve fit for the compensated pressure differentials; and
    generating a total velocity vector of the airflow based on the plurality of individual velocity vectors across the lip of the air duct.

19. The method of claim 18, wherein compensating the plurality of pressure measurements for vehicle attitude includes compensating for the ducted fan air-vehicle pitch attitude.

20. The method of claim 18, wherein compensating the plurality of pressure measurements for vehicle attitude includes compensating for the ducted fan air-vehicle roll attitude.

* * * * *